Sept. 1, 1953  E. C. KARSTEDT  2,650,451
CONTAINER-DISPENSER FOR POISONED BAIT
Filed Feb. 7, 1951
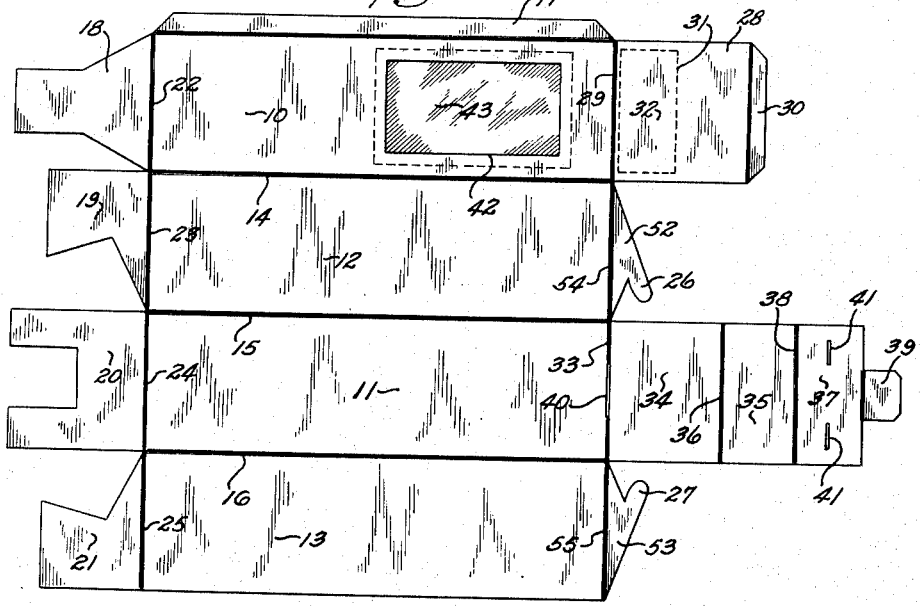
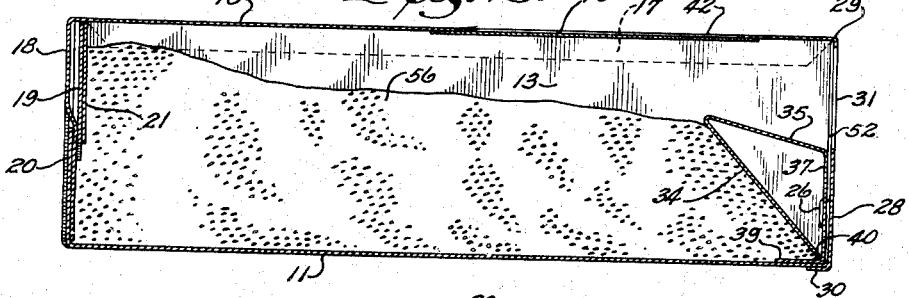
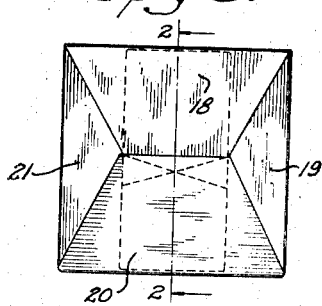
INVENTOR.
Elmer C. Karstedt
BY
Morsell & Morsell
ATTORNEYS.

Patented Sept. 1, 1953

2,650,451

UNITED STATES PATENT OFFICE 2,650,451

CONTAINER-DISPENSER FOR POISONED BAIT

Elmer C. Karstedt, Burlington, Wis.

Application February 7, 1951, Serial No. 209,873

5 Claims. (Cl. 43—131)

1

This invention relates to improvements in container-dispensers for poisoned bait.

In recent years a new type of poisoned bait for use in the extermination of mice and rats has been developed which bait must be consumed daily for a period of 3 to 5 days before it has a lethal effect upon the rodent. The advantage of this type of bait is that if there is a single accidental sampling by a human being or domestic animal, the concentration of poison is too small to cause any great injury.

In order to make proper use of this type of bait it must be properly maintained in a position where the rodent has constant access, and it is of course preferable to make such access difficult to children or domestic animals.

A general object of the present invention is to provide an improved container in which poisoned bait may be packaged, transported and sold, the container being so constructed that it may be quickly converted into an efficient dispenser by the user.

While this container may be made of paperboard, fiberboard, plastic material, metal or the like, nevertheless a further object of the invention is to provide a container which can be formed in a practical knockdown manner from cut and scored sheet material, preferably paperboard.

A further object of the invention is to provide a container-dispenser which, when in a dispensing condition, effectively shields the contents from rain so that the dispenser may be used outdoors if desired. Outdoor placement is generally necessary when the bait is to be used for the extermination of rats.

A further object of the invention is to provide a device of the class described which when in dispensing condition, has an open door. The door is readily accessible to rodents, but the container is specially constructed to prevent the bait inside from rolling out of the open door, and the container is specially constructed to keep the bait at a sufficient distance inwardly from the open door so that it cannot be reached without actually entering the dispenser. Thus, the dispenser can be safely used in chicken houses without fear of the chickens being able to get at the bait.

A further object of the invention is to provide a container-dispenser having a transparent window which is so located as to be useful in displaying the contents for merchandising purposes and also to be useful in enabling the user of the dispenser to ascertain when the bait has been used up.

2

Other objects of the invention are to provide an improved container-dispenser which is relatively simple and inexpensive to construct, which is neat in appearance, and which is otherwise well adapted for the purposes described.

With the above and other objects in view, the invention consists of the improved container-dispenser for poisoned bait and all of its parts and combinations, as set forth in the claims, and all equivalents thereof.

In the accompanying drawing, illustrating one complete embodiment of the preferred form of the invention, in which the same reference numerals designate the same parts in all of the views:

Fig. 1 is a plan view showing a cut and scored blank for the improved container-dispenser;

Fig. 2 is a longitudinal vertical sectional view of the container-dispenser in dispensing condition and taken on the line 2—2 of Fig. 3.

Fig. 3 is an elevational view looking at the closed end of the dispenser;

Fig. 4 is a similar view looking at the opposite end of the container-dispenser just after the container has been filled with bait and before the closure flap has been sealed; and Fig. 5 is a view of the same end showing the closure flaps in closed condition and also showing the door cut out to provide an admission opening for rodents.

Referring more particularly to the drawing the container-dispenser may be made of paperboard, fiberboard, plastic, metal, or any other suitable material. However, in the preferred embodiment illustrated, the container is shown as formed of foldable sheet material, preferably paperboard. When thus formed, the cartons can be punched out by the use of high speed machinery thereby rendering manufacture quick and inexpensive.

In the preferred form there is a top wall 10, a bottom wall 11, and side walls 12 and 13 which are connected so as to be foldable relative to one another on lines of scoring 14, 15 and 16. The top wall 10 may also be provided with a foldable assembly flap 17. Foldably connected to one of the ends of the members 10, 11, 12 and 13 are end closure flaps 18, 19, 20 and 21 which flaps are foldable on lines of scoring 22, 23, 24 and 25. While the flaps 18 to 21 may be of any type to form a closure for the permanently closed end of the container-dispenser, they have been shown in the drawing as cut and notched in a manner to provide the type of interlocking closure shown in Figs. 1 and 3, which type of interlocking closure is well known.

At the opposite end of the container the walls 12 and 13 are provided with relatively short triangularly shaped flaps 52 and 53 which flaps are foldable on lines of scoring 54 and 55. The flaps are formed with tongues 26 and 27 which project downwardly when the container is in the dispensing condition of Fig. 4. The top wall 10 has an outer closure flap 28 foldably connected thereto on a line of scoring 29, and this flap is of a size to cover the entire end and is provided with an extension flap 30 which is adhesively connected to the bottom wall 11, after the container has been assembled and filled as is clear from Fig. 2. The flap 28 is also formed in its upper half with a rectangular line of perforations 31 whereby the material 32, within the outline of the perforations, may be knocked out, as shown in Figs. 2 and 5 to render the device ready for use in dispensing the poisoned bait. This rectangular opening provides a doorway for the admission of rodents.

Connected to the bottom wall 11 on a line of scoring 33 is a first section of material 34. A second section of material 35 is connected to section 34 and is foldable relative thereto on a line of scoring 36. A third section of material 37 is foldable relative to the section 35 on a line of scoring 38. Projecting from the free edge of the section 37 is a tab 39 which is cooperable in assembly with a slot 40, the latter being coincidental with the line of scoring 33. Spaced slots 41 in the section 37 are provided for cooperation with the tongues 26 and 27 as shown in Figs. 2, 4 and 5.

If desired a portion of the top wall 10 may be cut out to provide a window 42, and the latter may be covered with celluloid or other transparent material 43 such as regenerated cellulosic material. In use of the improved device, the cartons may be shipped by the carton manufacturer in knock-down form to the concern packaging the toxic bait. This bait is preferably grain which is treated with a pre-determined quantity of poison. The cartons are then assembled into the condition of Fig. 4 and filled to a required level while the closure flap 28 is in open condition. No greater amount of bait should be placed in the device than is shown in Fig. 2. After the container has been filled to a selected level the flap 28 is lowered and the tab 30 is adhesively connected to the bottom wall 11. The opposite end wall is, of course, closed before filling. The carton in this condition forms an attractive merchandising package and the window 43 permits the purchaser to view the contents.

When the container dispenser is to be used by a purchaser the material 32 is punched out of the closure 28 without opening the closure. This provides an access opening the lower edge of which is spaced above the bottom of the container. Before being placed in the position of Fig. 2 the granular material is shaken toward the closed end of the carton so that it is all confined behind the dam forming partition 34, as shown in Fig. 2. When in this condition the top of the pile of bait is maintained away from the access opening 31 so that a rodent must actually enter the opening 31 and crawl over the walk 35 before there is access to the bait. Chickens, on the other hand cannot get access to the bait because the opening is too small and the bait is maintained in a position where it does not spill out of the opening. For the same reasons the bait is inaccessible to dogs or domestic animals. Thus, it is entirely safe to use the dispenser in a chicken house when it is desired to exterminate the mice therein. On the other hand, it is entirely practical to use the dispenser outdoors.

In the embodiment of the invention illustrated, the walk 35 and dam 34 are formed in a simple manner as an integral part of a knock-down carton, it being merely necessary during assembly to fold the sections 34, 35 and 37 to the triangular shape of Fig. 2 and insert the tab 39 in the slot 40. The side wings 52 and 53 are then folded over side portions of the section 37, as shown in Fig. 4, and the tongues 26 and 27 inserted in the slots 41. This provides an opening in the upper half of the end wall which registers with the opening 31 of the closure 28 after the material 22 is punched out. The tongues 26 and 27 which coact with the slots 41 perform the function of preventing the triangle, formed by the sections 34, 35 and 37, from tilting inwardly under the weight of the rodent. If it were not for the tongues such tilting would be likely to occur at a time when the contents of the dispenser was low enough to take away support from behind the section 34.

It is preferred to have the walk portion 35 extend upwardly at somewhat of an incline as shown in Fig. 2. It is, of course, entirely practical to form both ends of the container with the access opening. This, however, is usually unnecessary and, therefore, it is preferred to have a standard type of closure at the other end such as the one illustrated in Fig. 3.

The window 43 in the top of the dispenser enables the user to quickly inspect the interior of the dispenser to see whether or not any of the bait has been consumed and thereby ascertain whether it is effective in attracting rodents.

While the knock-down construction is an important part of the present invention, nevertheless broader aspects of the invention contemplate the formation of the container-dispenser from other materials and such containers are comprehended by the present invention, whether knock-down or not, or whether or not formed from a single blank.

Various other changes may be made without departing from the spirit of the invention, and all of such changes are contemplated as may come within the scope of the claims.

What I claim is:

1. A container-dispenser for toxic granular bait or the like comprising a receptacle formed from a blank of sheet material which has been cut, scored, and folded to provide a bottom on which the device is adapted to rest when in use for dispensing purposes, to provide a top and to provide sides; an elongated extent of material foldably connected to one end of said bottom and having spaced lines of transverse scoring to form three sections, the first of said sections extending obliquely inwardly and upwardly from said bottom, the second of said sections extending outwardly from the upper edge of the first section, and the third of said sections extending downwardly, there being an access opening above said third section of material; means for closing said access opening prior to use of the device for dispensing purposes; and means for closing the opposite end of said container.

2. A container-dispenser for toxic granular bait or the like comprising a receptacle formed from a blank of sheet material which has been cut, scored and folded to provide a bottom on which the device is adapted to rest when in use for dispensing purposes, to provide a top and to provide sides; an elongated extent of material foldably connected to one end of said bottom and having spaced lines of transverse scoring to form three sections, the first of said sections having a slot and extending obliquely inwardly and upwardly from said bottom, the second of said sections extending outwardly from the upper edge of the first section, and the third of said sections extending downwardly and having a tab which is removably inserted in the slot of said first section, there being an access opening above said third section of material; means for closing said access opening prior to use of the device for dispensing purposes; and means for closing the opposite end of said container.

3. A container dispenser for toxic granular bait or the like comprising a paper board receptacle formed from a blank of sheet material which has been cut, scored and folded to provide a bottom on which the device is adapted to rest when in use for dispensing purposes, to provide a top and to provide sides; an elongated extent of material foldably connected to one end of said bottom and having spaced lines of transverse scoring to form three sections, the first of said sections extending inwardly and upwardly from said bottom, the second of said sections extending outwardly at an angle downwardly, and the third of said sections extending downwardly, there being an access opening above said third section of material; means for closing said access opening prior to use of the device for dispensing purposes; and means for closing the opposite end of said container.

4. A container dispenser for toxic granular bait or the like comprising a paper board receptacle formed from a blank of sheet material which has been cut, scored and folded to provide a bottom on which the device is adapted to rest when in use for dispensing purposes, to provide a top and to provide sides; an elongated extent of material foldably connected to one end of said bottom and having spaced lines of transverse scoring to form three sections, the first of said sections extending inwardly and upwardly from said bottom, the second of said sections extending outwardly at an angle downwardly, and the third of said sections extending downwardly, wings folded from the receptacle sides over side portions of said third section of material and connected thereto, there being an access opening above said third section of material and between upper portions of said wings; means for closing said access opening prior to use of the device for dispensing purposes; and means for closing the opposite end of said container.

5. A container dispenser for toxic granular bait or the like comprising a paper board receptacle formed from a blank of sheet material which has been cut, scored and folded to provide a bottom on which the device is adapted to rest when in use for dispensing purposes, to provide a top and to provide sides; an elongated extent of material foldably connected to one end of said bottom and having spaced lines of transverse scoring to form three sections, the first of said sections extending inwardly and upwardly from said bottom, the second of said sections extending outwardly at an angle downwardly, and the third of said sections extending downwardly and having spaced slots, wings folded from the receptacle sides over side portions of said third section of material and having tabs removably inserted in the spaced slots of said third section of material, there being an access opening above said third section of material and between upper portions of said wings; means for closing said access opening prior to use of the device for dispensing purposes; and means for closing the opposite end of said container.

ELMER C. KARSTEDT.

References Cited in the file of this patent

UNITED STATES PATENTS

| Number | Name | Date |
|---|---|---|
| 610,775 | Thompson | Sept. 13, 1898 |
| 894,692 | Oertel | July 28, 1908 |
| 1,192,334 | Martin | July 25, 1916 |
| 1,209,993 | Oettinger | Dec. 26, 1916 |
| 1,352,067 | Keyser | Sept. 7, 1920 |
| 1,940,010 | Murray | Dec. 19, 1933 |
| 2,157,953 | De Long | May 9, 1939 |
| 2,300,703 | Ray | Nov. 3, 1942 |
| 2,340,255 | Weil | Jan. 25, 1944 |
| 2,472,183 | Williamson | June 7, 1949 |

FOREIGN PATENTS

| Number | Country | Date |
|---|---|---|
| 541,844 | Great Britain | Dec. 15, 1941 |